(12) United States Patent
Leone et al.

(10) Patent No.: US 11,193,409 B2
(45) Date of Patent: Dec. 7, 2021

(54) METHOD FOR MANAGING THE LIGHTOFF OF A POLLUTION-CONTROL CATALYTIC CONVERTER

(71) Applicant: Nissan Motor Co., Ltd., Yokohama (JP)

(72) Inventors: Thomas Leone, Boulogne-Billancourt (FR); Guillaume Saucereau, Boulogne-Billancourt (FR)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 17/058,732

(22) PCT Filed: May 28, 2019

(86) PCT No.: PCT/EP2019/063732
§ 371 (c)(1),
(2) Date: Nov. 25, 2020

(87) PCT Pub. No.: WO2019/229027
PCT Pub. Date: Dec. 5, 2019

(65) Prior Publication Data
US 2021/0215075 A1    Jul. 15, 2021

(30) Foreign Application Priority Data

May 29, 2018 (FR) ...................................... 1854587

(51) Int. Cl.
*F01N 3/10* (2006.01)
*F01N 11/00* (2006.01)

(52) U.S. Cl.
CPC ............ *F01N 3/101* (2013.01); *F01N 11/002* (2013.01); *F01N 2550/02* (2013.01); *F01N 2560/07* (2013.01); *F01N 2900/0418* (2013.01); *F01N 2900/1404* (2013.01); *F01N 2900/1621* (2013.01)

(58) Field of Classification Search
CPC ... B01D 53/9495; F01N 11/00; F01N 11/002; F01N 2550/02; F01N 2900/1404; F01N 2900/1631; F02D 41/1446
See application file for complete search history.

(56) References Cited

U.S. PATENT DOCUMENTS

| 10,808,594 | B2 * | 10/2020 | Dimoski ................. F01N 11/00 |
| 2004/0065077 | A1 | 4/2004 | Ueno et al. |
| 2015/0275792 | A1 * | 10/2015 | Genslak .............. F02D 41/1446 |
| | | | 60/274 |

FOREIGN PATENT DOCUMENTS

| EP | 0639708 A1 | 2/1995 |
| EP | 0639708 B1 | 3/1998 |
| FR | 2981690 A3 | 4/2013 |

* cited by examiner

*Primary Examiner* — Anthony Ayala Delgado
(74) *Attorney, Agent, or Firm* — Global IP Counselors, LLP

(57) ABSTRACT

A method is provided for managing the light-off of a 3-way catalytic converter that is located in an exhaust line of a petrol engine having a plurality of cylinders with each cylinder having at least one exhaust valve. The method includes calculating a value of enthalpy of exhaust gases to make it possible to determine a quantity of heat supplied to the three-way catalyst, determining a threshold enthalpy value signaling the light-off of the catalyst, and stopping of activation of the three-way catalyst upon determining the value of the enthalpy that was calculated has reached the threshold enthalpy value.

7 Claims, 1 Drawing Sheet

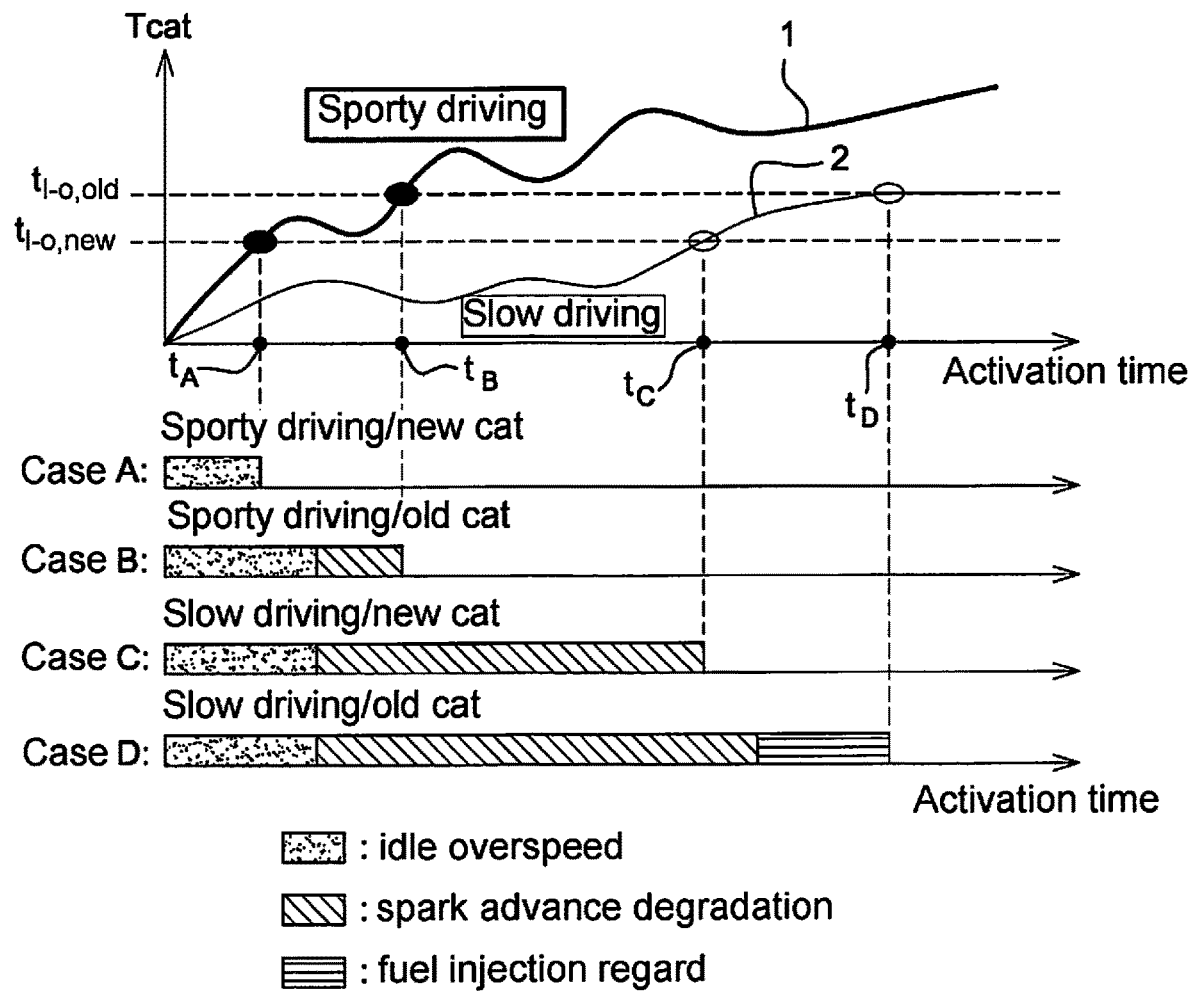

METHOD FOR MANAGING THE LIGHTOFF OF A POLLUTION-CONTROL CATALYTIC CONVERTER

CROSS-REFERENCE TO RELATED APPLICATIONS

This application is a U.S. national stage application of International Application No. PCT/EP2019/063732, filed on May 28, 2019, that claims priority to French Patent Application No. 1854587, filed on May 29, 2018.

BACKGROUND

Technical Field

The invention relates to a method for managing the light-off of a pollution-controlled catalyst of an internal combustion engine of controlled emission type (operating with petrol).

Background Information

To meet the regulations on polluting emissions, a three-way catalyst on petrol engine systems has become mandatory. In fact, the latter makes it possible to treat the three main pollutants, namely unburned hydrocarbons (HC), the carbon monoxide (CO) and the nitrogen oxides (NOx), with an efficiency greater than 98% on average. Now, the catalyst becomes effective only when it reaches a certain temperature, called light-off temperature.

There are now engine control strategies, which allow for an activation (MEA) of the catalyst at the earliest possible moment after a cold start. These strategies consist in adapting certain setting parameters of the engine to obtain a rapid warm-up, owing to the degradation of the combustion efficiency of the engine, which leads to heat losses at the engine exhaust.

However, with these control strategies, it is not possible to know the number of calories sent to the catalyst during the warm-up. If the heating is stopped too early, the catalyst is not hot enough and is therefore not effective enough. On the other hand, if the heating is continued for too long for safety, that is reflected in a fuel overconsumption, the combustion efficiency of the engine having been degraded for too long. In other words, these strategies are not accurate enough to stop the activation phase at the exact moment when the light-off temperature of the catalyst is reached.

Some current engine control strategies are known from the state of the art which allow for a management of the activation in open loop mode and without estimator.

For example, the publication EP-B1-0639708 discloses an internal combustion engine control method that is used to rapidly heat up a catalyst to its operating temperature. The mass flow rate of air feeding the engine is increased together with an adaptation of the weight of fuel, and the ignition angle is offset as far as possible in the retard direction. This means makes it possible to increase the mass flow of exhaust gas and thus the temperature of the exhaust gases while conserving the engine torque: that corresponds to an increase in the enthalpy flow of the exhaust gases, allowing for a rapid heating of the catalyst. Nevertheless, such a method lacks accuracy, because there is neither measurement nor control of the quantity of heat supplied.

That can have the consequence of:
Either stopping the activation too early while the catalyst has not reached its optimal pollutant treatment temperature. In this case, that can temporarily lead to excess pollutant emissions.
Or stopping the activation too late while the catalyst has reached, from a certain moment, its optimal pollutant treatment temperature. In this case, that can lead to a fuel overconsumption, which is not desirable.

A method for managing light-off of a catalyst according to the invention makes it possible to dependably and accurately reach the light-off temperature of the catalyst, in order to stop the activation at exactly the right moment.

SUMMARY

The subject of the invention is a method for managing light-off of a three-way catalyst placed in an exhaust line of a petrol engine, said engine comprising cylinders each provided with at least one exhaust valve.

According to the invention, a management method according to the invention comprises the following steps:
A step of calculation of the enthalpy H of the exhaust gases, making it possible to determine the quantity of the supply to the catalyst,
A step of determination of a threshold enthalpy value S signaling the light-off of the catalyst,
A step of stopping of the activation of the catalyst when the calculated value of the enthalpy H reaches said threshold enthalpy value S.

The principle of such a method is to accurately control the temperature rise time of the catalyst via the quantity of heat supplied by the exhaust gases. In this way, the stopping of the activation of the catalyst is performed at exactly the right moment, and not in a fixed manner by setting an arbitrary activation stoppage value, as the current methods propose. A method according to the invention therefore proposes the fairest possible approach, which takes account of physico-chemical phenomena involved in the interaction between the exhaust gases and the catalyst. Preferentially, such a management method is driven by a computer embedded in the vehicle and having a program capable of performing the main steps of such a method.

Advantageously, the calculation of the enthalpy is performed on the basis of the following time integral, the integration beginning when the engine starts up:

$$\Delta H = \int Q_{ech} \times C_p \times T_{avt} \times dt$$

where:
$Q_{ech}$=mass flow rate of gas at the exhaust (kg/h),
$C_p$=heat capacity of the exhaust gases (J/kg/K),
$T_{avt}$=temperature of the gases at the exhaust valves (K).

It should be noted that the heat capacity of the exhaust gases is a constant, and that the mass flow of gas at the exhaust and the temperature of the gases at the exhaust valves are two parameters which can either be measured with suitable sensors, or be deduced from previously established mappings.

For example, the mass flow rate of gas at the exhaust is determined by means of a flow meter. It can also be deduced, as is known per se, from an open position of a gas intake valve of the engine and from a pressure value and a temperature value in an engine intake manifold.

Preferentially, the temperature of the gases at the exhaust valves is modelled beforehand by an estimator derived from a cartographic model which is a function of the torque and of the engine speed, and which is corrected by the engine water temperature T°, by the spark advance and by the fuel-air ratio in the cylinder.

As a variant, the temperature of the exhaust gases can be deduced from the temperature of the exhaust gases at a point of the exhaust circuit situated in proximity to the exhaust valves, for example a point of the engine exhaust manifold.

Advantageously, the threshold enthalpy value S is a function of the engine water temperature on startup and of the state of ageing of the catalyst. In this way, the higher the water temperature is on startup, the fewer the calories need to be added to heat the catalyst. Likewise, the newer the catalyst is, the less time it will take to bring the catalyst to its light-off temperature, because the light-off temperature of a new catalyst is lower than that of an older catalyst.

Advantageously, the threshold enthalpy value S is equal to the product of a first factor which is a decreasing function of the water temperature on startup of the engine, and of a second factor lying between a positive value close to 0 and a value close to 1 and which depends on the state of ageing of the catalyst.

Preferentially, the second factor tends toward a value close to 0 when the catalyst is new and tends towards a value close to 1 when the catalyst is very old.

For example, the state of ageing of the catalyst is determined from the damping of the amplitude of a signal of fuel-air ratio downstream of the catalyst relative to the amplitude of a fuel-air ratio signal upstream of said catalyst, which characterizes its oxygen storage capacity, also referred to by its acronym OSC. Reference can for example be made to the publication FR-A1-2981690 which presents such a method for assessing the state of ageing of a three-way catalyst.

A management method according to the invention offers the advantage of proposing a concrete and realistic solution for stopping the activation of the catalyst, thus avoiding having a largely inefficient catalyst if the supply of calories has been interrupted before it has reached its light-off temperature, or having a fuel overconsumption if the supply of calories is continued even if it has already reached its light-off temperature. The result thereof is that, with such a method, the catalyst will always be effective, whatever the temperature of the water on startup and the state of ageing of the catalyst.

BRIEF DESCRIPTION OF THE DRAWINGS

Referring now to the attached drawings which form a part of this original disclosure:

FIG. 1 is a diagram of the temperature of the catalyst as a function of time, illustrating stoppages of activation of the catalyst according to several configurations, incorporating, in four different cases, a particular driving style and a state of ageing of the catalyst.

DETAILED DESCRIPTION OF EMBODIMENTS

A detailed description of a preferred embodiment of a management method according to the invention is given hereinbelow.

FIG. 1 is a diagram of the temperature of the catalyst as a function of time, illustrating stoppages of activation of the catalyst according to several configurations, incorporating, in four different cases, a particular driving style and a state of ageing of the catalyst.

The principle of a management method according to the invention consists in estimating the quantity of heat or the number of calories to be sent to the catalyst to stop its activation at exactly the right moment. It is assumed that this management method is implemented by a computer embedded in a vehicle having a petrol engine, said engine comprising cylinders each equipped with at least one intake valve and at least one exhaust valve.

Thus, such a method comprises the following steps:

A step of calculation of the enthalpy H of the exhaust gases, making it possible to determine the quantity of the heat supplied to the catalyst. In fact, the detection of the light-off of the catalyst is performed by monitoring the enthalpy H of the exhaust gases, which is calculated from the following time integral, the integration beginning when the engine starts up:

$$\Delta H = \int Q_{ech} \times C_p \times T_{avt} \times dt$$

where:

$Q_{ech}$ the mass flow rate of gas at the exhaust (kg/h). This flow rate can for example be measured by means of a flow meter.

$C_p$ the heat capacity of the exhaust gases (J/kg/K) which is a constant.

$T_{avt}$ the temperature of the gases at the exhaust valves (K).

This temperature can be modelled beforehand by an estimator derived from a cartographic model which is a function of the engine speed and torque, corrected by the T° of the water of the engine, by the spark advance and by the fuel-air ratio in the cylinder. To recap, the fuel-air ratio is the ratio of the quantity of fuel divided by the quantity of air. This temperature of the gases at the valves will therefore depend on the driving style of the driver, which can, for example be sporty driving or flexible driving.

A step of determination of a threshold enthalpy value S signaling the light-off of the catalyst. This threshold enthalpy is a function of two parameters, which are the water temperature on startup and the state of ageing of the catalyst. Thus, as a nonlimiting example, the threshold enthalpy S is equal to the product: of a first factor which is a decreasing function of the water temperature when the engine starts up. Thus, the higher the water temperature is on startup the fewer the calories that have to be added to heat the catalyst, and a second factor lying between a value close to 0 and a value equal to 1, depending on the state of ageing of the catalyst. This way, this second factor tends toward 0 when the catalyst is new and is 1 when the catalyst is very old. This reflects the fact that the newer the catalyst is, the less time it will take to heat said catalyst to bring it to its light-off temperature. The ageing of the catalyst, which corresponds to its loss of effectiveness, can for example be determined from the damping of the amplitude of a signal of fuel-air ratio downstream of the catalyst, measured by an oxygen probe downstream of the catalyst, relative to the amplitude of a signal of fuel-air ratio upstream of the catalyst, measured by an oxygen probe upstream of the catalyst. Any other diagnostic method known to the person skilled in the art, such as, for example, a calculation of the maximum oxygen storage capacity, can also be used to determine the state of ageing of the catalyst.

A step of stopping of the activation of the catalyst when the calculated enthalpy value H reaches the threshold enthalpy value S.

Referring to FIG. 1, which illustrates the change in temperature of the catalyst as a function of the period of activation of said catalyst, for a given type of driving of the vehicle, and for a given state of ageing of the catalyst, the curve 1 relates to sporty driving and the curve 2 relates to slower driving. Temperature corresponding to sporty driving increases more rapidly than that which corresponds to slower driving because of the discharging of a greater number of calories at the exhaust of the engine. For one and the same catalyst light-off temperature, the necessary activation period is therefore shorter in the case of sporty driving than in the case of slower driving.

Also, the light-off temperature of a new catalyst $T_{1\text{-}one}$ is lower than the light-off temperature of an old catalyst $T_{1\text{-}o,odd}$, as can be seen on the ordinate axis of the diagram of FIG. 1. For an identical driving profile, the necessary activation period is therefore shorter in the case of a new catalyst than in the case of an old catalyst.

The result of this dual comparison is a ranking of the activation periods corresponding to the following four cases A, B, C, D represented in FIG. 1:

Case A: activation period $t_A$; case of a new catalyst for sporty driving;
Case B: activation period $t_B$; case of an old catalyst for the same sporty driving as in the case A;
Case C: activation period $t_C$; case of the same new catalyst as in the case A for slow driving;
Case D: activation period $t_D$; case of the same old catalyst as in the case A, for the same slow driving as in the case C.

It is found that the following inequations are borne out:
$t_A<t_B$ and $t_C<t_D$ (effect of just the ageing of the catalyst),
$t_A<t_C$ and $t_B<t_D$ (effect of just the driving profile).

Also, it is found that the ageing of a catalyst has a greater influence on the activation period than the type of driving profile, which is reflected by the verification of the inequation: $t_B<t_C$, such that the following hierarchy is verified:

$$t_A<t_B<t_C<t_D.$$

In a nonlimiting manner, it is possible to implement different types of modification of the setting of the engine to form this heating of the catalyst.

For example, for a very short activation (case A for example), it is possible to simply increase the idle overspeed. For a slightly longer activation (cases B and C for example), it is possible to add, to the increase of the overspeed which takes place only when idling, a specific setting mode of the engine over all of its operating points which consists in degrading the spark advance. Finally, if the activation is destined to be even longer (case D for example), it is possible, for example, after a certain time, to degrade the combustion efficiency of the engine even further, for example by retarding the injection of the fuel into the cylinders, at the cost of increased overconsumption. Obviously, other setting choices can be made, either as alternatives depending on the activation period, or in combination, without departing from the scope of the invention.

The invention claimed is:

1. A method for managing light-off of a three-way catalyst placed in an exhaust line of a petrol engine, the engine having a plurality of cylinders with each of the cylinders being provided with at least one exhaust valve, the method comprising:

calculating a value of enthalpy of exhaust gases to make it possible to determine a quantity of heat supplied to the three-way catalyst,
determining a threshold enthalpy value signaling the light-off of the catalyst based on at least one of an engine water temperature on startup and a state of aging of the three-way catalyst, and
stopping of activation of the three-way catalyst upon determining the value of the enthalpy that was calculated has reached the threshold enthalpy value.

2. The management method as claimed in claim 1, wherein
the calculating of the enthalpy is performed by integration beginning when the engine is started up based on a time integral as follows:

$$\Delta H=\int Qech\times Cp\times Tavt\times dt$$

where:
Qech=mass flow rate of gas at the exhaust (kg/h),
Cp=heat capacity of the exhaust gases (J/kg/K),
Tavt=temperature of the gases at the exhaust valves (K).

3. The management method as claimed in claim 2, wherein
the mass flow rate of gas at the exhaust is determined by using a flow meter.

4. The management method as claimed in claim 2, wherein
the temperature of the gases at the exhaust valves is modelled beforehand by an estimator derived from cartographic model which is a function of torque and of engine speed, and which is corrected by the engine water temperature, by a spark advance and by a fuel-air ratio in the cylinder.

5. The management method as claimed in claim 1, wherein
the threshold enthalpy value is equal to a product of a first factor which is a decreasing function of the engine water temperature on the startup of the engine, and of a second factor lying between a positive value close to 0 and a value close to 1 and which depends on the state of aging of the three-way catalyst.

6. The management method as claimed in claim 5, wherein
the second factor tends toward a value close to 0 when the three-way catalyst is new and tends towards a value close to 1 when the three-way catalyst is very old.

7. The management method as claimed in claim 5, wherein
the state of aging of the catalyst is determined from a damping of an amplitude of a signal of fuel-air ratio downstream of the three-way catalyst relative to an amplitude of a fuel-air ratio signal upstream of the three-way catalyst.

* * * * *